US011037171B2

(12) United States Patent
Curetti et al.

(10) Patent No.: US 11,037,171 B2
(45) Date of Patent: Jun. 15, 2021

(54) METHOD FOR VERIFYING THE VALIDITY AND DELIVERING A PROOF OF PURCHASE FROM A MOBILE DEVICE AND ASSOCIATED COMPUTER PROGRAM

(75) Inventors: Eli Curetti, Scarsdale, NY (US); Quentin De Chivre, Paris (FR); Philippe Cantet, Paris (FR)

(73) Assignee: QUOTIENT TECHNOLOGY INC., Mountain View, CA (US)

(*) Notice: Subject to any disclaimer, the term of this patent is extended or adjusted under 35 U.S.C. 154(b) by 1411 days.

(21) Appl. No.: 14/004,770

(22) PCT Filed: Apr. 6, 2011

(86) PCT No.: PCT/EP2011/055308
§ 371 (c)(1),
(2), (4) Date: Sep. 12, 2013

(87) PCT Pub. No.: WO2011/141238
PCT Pub. Date: Nov. 17, 2011

(65) Prior Publication Data
US 2014/0052654 A1    Feb. 20, 2014

(51) Int. Cl.
G06Q 30/00    (2012.01)
G06Q 10/10    (2012.01)
G06Q 30/06    (2012.01)

(52) U.S. Cl.
CPC ......... G06Q 30/0185 (2013.01); G06Q 10/10 (2013.01); G06Q 30/06 (2013.01)

(58) Field of Classification Search
CPC .......... G06Q 30/0207; G06Q 30/0221; G06Q 30/0185; G06Q 30/06; G06Q 10/10
See application file for complete search history.

(56) References Cited

U.S. PATENT DOCUMENTS

2008/0082408 A1* 4/2008 Santa Ana ............. G06Q 30/02
                                                                  705/14.11
2011/0015984 A1* 1/2011 Galinos .............. G06Q 30/0225
                                                                  705/14.26
(Continued)

FOREIGN PATENT DOCUMENTS

CA      2962648 A1 *    4/2007    ............. G06F 19/00

OTHER PUBLICATIONS

J. Woo, A. Bhargav-Spantzel, A. C. Squicciarini and E. Bertino, "Verification of Receipts from M-commerce Transactions on NFC Cellular Phones," 2008 10th IEEE Conference on E-Commerce Technology and the Fifth IEEE Conference on Enterprise Computing, E-Commerce and E-Services, Arlington, VA, USA, 2008 (Year: 2008).*

*Primary Examiner* — Gabrielle A McCormick
*Assistant Examiner* — Maame Ofori-Awuah
(74) *Attorney, Agent, or Firm* — Baker Botts L.L.P.

(57) ABSTRACT

The invention is directed to a method for generating a record (R1-R1) corresponding to the validity of a proof of purchase including obtaining (98) product data elements (31-37) by a camera (24), a keyboard (28) or near-field communication through a mobile device (1), determining (99) contextual information of the mobile device (1) such as its geolocalization, transmitting (100, 101) product data elements (31-37) and contextual information to a server (2), determining (102) on the server (2) from the contextual information and the product data element (31-37) whether the proof of purchase is valid and generating (107) a record (R1-RI) corresponding a valid proof of purchase.

18 Claims, 4 Drawing Sheets

(56) References Cited

U.S. PATENT DOCUMENTS

| | | | |
|---|---|---|---|
| 2011/0063108 A1* | 3/2011 | Aonuma | G06Q 20/4016 340/540 |
| 2011/0087596 A1* | 4/2011 | Dorsey | G06Q 20/32 705/44 |
| 2012/0010930 A1* | 1/2012 | Langdon | G06Q 30/0207 705/14.16 |
| 2012/0226579 A1* | 9/2012 | Ha | G06Q 30/02 705/26.35 |

* cited by examiner

METHOD FOR VERIFYING THE VALIDITY AND DELIVERING A PROOF OF PURCHASE FROM A MOBILE DEVICE AND ASSOCIATED COMPUTER PROGRAM

FIELD OF THE INVENTION

The invention is directed to a method for verifying the validity and delivering a proof of purchase from a mobile device and the associated computer program.

DESCRIPTION OF THE PRIOR ART

The purpose of a proof of purchase is amongst others:
to qualify for a mail-in rebate,
to be eligible for a refund,
to apply a discount,
to apply a coupon,
to start a warranty period,
to join a user club,
to be entitled to product support and updates.

Currently, a proof of purchase is automatically implied when a customer pays for his product at the checkout register, allowing, for instance, application of an instant rebate from a coupon.

Other means to prove a purchase include mailing proof elements such as a receipt, a return card or code contained in the product, a portion of the packaging, and/or the barcode. This requires the mailing of the proof elements by the customer to a mail-in clearinghouse and further processing.

Traditionally, coupons, discounts, or rebates, can either be applied at the checkout register directly at time of purchase and/or after by applying for a rebate, for example, a mail-in or Internet based rebate. These methods involve the intervention of a third party (e.g., the cashier at the retail location and/or participation of a rebate clearinghouse).

Moving to a mobile based electronic proof of purchase system would enable receiving instant rebates, coupons, or discounts, without relying on a third party.

The invention is therefore directed to meeting at least this need by electronically generating a record of proof of purchase based on a function of the level of proof provided by the customer, thereby facilitating the establishment of the proof of purchase by the customer.

SUMMARY OF THE INVENTION

A customer is notified of a promotion on a given product by traditional means (for example a newspaper, a coupon catalog, a mailing, direct marketing, a website, etc.) and/or directly through mobile advertising on a mobile phone (e.g., short message service ("SMS"), push notification, advertisements, etc.). Instead of using a traditional coupon process (redeeming the rebate at the checkout register or by applying for a rebate (e.g., mail-in)), the customer can purchase the promoted product at retail price and apply the rebate, coupon and/or discount without third-party intervention after the purchase by generating an electronic proof of purchase on a mobile device.

To generate said proof of purchase, the customer has to prove he has actually purchased the product and that the product is eligible for the promotion. To prove that the product is eligible, the customer can obtain and transmit identifying images and/or other data enabling identification of the product. Such images and/or other data can be a scan of the product's barcode, a picture of the product packaging, a code printed or stuck on the product, data from an RFID chip associated with the product, and/or any other suitable product element as defined below.

To prove that the customer has purchased the product, one determines preferably whether the customer has left the store with the product, by using geolocalization capabilities (e.g., using a global positioning system ("GPS") receiver) of the mobile device. Alternatively, the mobile device can obtain additional or other contextual elements (such as, for example, ambient sound, ambient light, temperature, or other contextual elements defined below) to validate that the product has indeed left the store.

If a doubt remains regarding the purchase of the product (for example, a stolen product), the related computer program may require additional transaction data elements (such as an image of the transaction receipt, an electronic invoice, a confirmation email, or any other transaction data element as defined below), based on for example, fraud patterns.

The system furthermore relies on a user trust level, which is defined by a score generated by a scoring algorithm. Elements contributing to the calculation of the score are the personal information available on a given user in his user profile (e.g., identity information, credit card or banking information, etc.) and/or history of past successes and failures in providing additional product data elements and/or transaction data elements when requested.

Thus the invention is directed to a method for generating a record corresponding to the validity of a proof of purchase characterized in that it comprises the following steps:
  obtaining product data elements through a mobile device,
  determining contextual information of the mobile device,
  transmitting product data elements and contextual information to a server,
  determining on the server from the contextual information and the product data element whether the proof of purchase is valid and
  generating a record corresponding to the validity of the proof of purchase.

According to some embodiments, the product data elements are obtained by a camera (e.g., a digital camera), a keyboard, and/or near-field communication.

The product data element can be at least one of the following: the barcode of the product, a full or partial view of the product packaging, the product logo, the product serial number, the product batch number, the best before date of the product, a unique code printed or stuck on the product, any specific product area as instructed by a computer program, data from an RFID chip, or any data that can be gathered by the mobile device, for example using the mobile device's near-field communication capabilities.

The contextual information can include at least one of the following: geographic location of the device, the device's IP address, wireless networks available to the device, cellphone towers available to the device, ambient noise characteristics around the device, ambient light characteristics around the device, temperature near the device, pressure near the device, mobile device orientation and/or accelerometer data. The term "near" in this context shall be understood to mean sufficiently close to be within the capabilities of available sensors to sense the mentioned characteristic.

According to some embodiments the method comprises the following steps:
  storing on the server a database establishing a correspondence between stores and locations of said stores and a list of valid product data elements, determining on the server whether the product data element is contained within the list of valid product data elements, determining whether the location of the mobile device matches a location stored in the database in order to determine whether or not the mobile device is effectively in a store, if the product data element is contained within the list of valid product data elements and if the location of the mobile device does not match a location stored in the database, generating a record corresponding to a valid proof of purchase.

According to embodiments of the invention, if the location of the mobile device matches a location stored in the database it comprises the further steps of displaying a message to the user requesting a transaction data element for determining whether the product has effectively been purchased, obtaining the transaction data element, transmitting the requested transaction data element to the server storing a data base containing criteria for a valid transaction, determining whether the transaction data element matches the criteria of a valid transaction, if the transaction data element matches the criteria of a valid transaction, generating a record corresponding to a valid proof of purchase.

According to embodiments of the invention, if no transaction data element is obtained or if the transaction data element does not match the criteria of a valid transaction, the method further comprises generating a record corresponding to an invalid proof of purchase.

According to embodiments of the invention, the method comprises the following steps:

determining on the server whether the proof of purchase of a given product has been claimed only once, if the proof of purchase has been claimed only once, generating a record corresponding to a valid proof of purchase.

According to embodiments of the invention the method comprises the following steps:

if the proof of purchase of the given product may have been claimed more than once, displaying a message to the user requesting to obtain at least one further product data element and/or a transaction data element, obtaining the further product data element and/or the transaction data element, transmitting the further product data element and/or the transaction data element to a server storing a database containing criteria for a valid transaction and a list of valid product data element, determining whether the obtained product data element matches the list of valid product data elements and/or the transaction data element matches criteria of a valid transaction, if the product data element matches the list of valid data and/or if the transaction data element matches the criteria of a valid transaction, generating a record corresponding to a valid proof of purchase.

According to embodiments of the invention, for determining whether the proof of purchase of a given product has been claimed only once, the method comprises the following steps:

storing in the server a database containing predetermined statistical fraud patterns, determining by statistical means whether or not the request of the user matches at least one of the fraud patterns, requesting further product data elements and/or transaction data elements for the requests matching the at least one statistical fraud pattern.

According to embodiments of the invention a server comprises a database storing identities of the users and a level of trust associated to each user, the step of requesting further product data elements and/or transaction data elements depends on the product data element and/or contextual information already provided and on said level of trust of the user.

According to embodiments of the invention the method comprises the following steps:

if the proof of purchase of the product may have been claimed more than once, and if the level of trust is superior to a given threshold value, then generating a record corresponding to a valid proof of purchase.

According to embodiments of the invention if the proof of purchase of the given product may have been claimed more than once, and if the level of trust is inferior to a given threshold value, then the method comprises the following step: generating a record corresponding to an invalid proof of purchase.

According to embodiments of the invention the level of trust of a user is based upon:

the number of pieces of information provided by the user validating his identity and/or the history of success of the user in providing further product data elements and/or transaction data elements when requested.

According to embodiments of the invention a circumstance parameter is stored in a database, the threshold value of the level of trust depending on said circumstance parameter.

According to embodiments of the invention the transaction data element contains at least the date of the purchase, the name of product purchased, the purchase amount, the purchase location and the transaction ID.

According to embodiments of the invention the transaction data element can be a transaction record such as a paper receipt, a credit card bill, an electronic fund transfer record, an electronic invoice, or a confirmation email of a purchase.

The invention is also directed to a computer program comprising computer readable program code adapted to be executed to implement the method according to the invention.

BRIEF DESCRIPTION OF THE DRAWINGS

The invention will be understood more clearly from the following description and from the accompanying figures. These figures are given purely by way of an illustration and in no way restrict the scope of the invention.

DESCRIPTION OF A PREFERRED EMBODIMENT OF THE INVENTION

Figure 1:
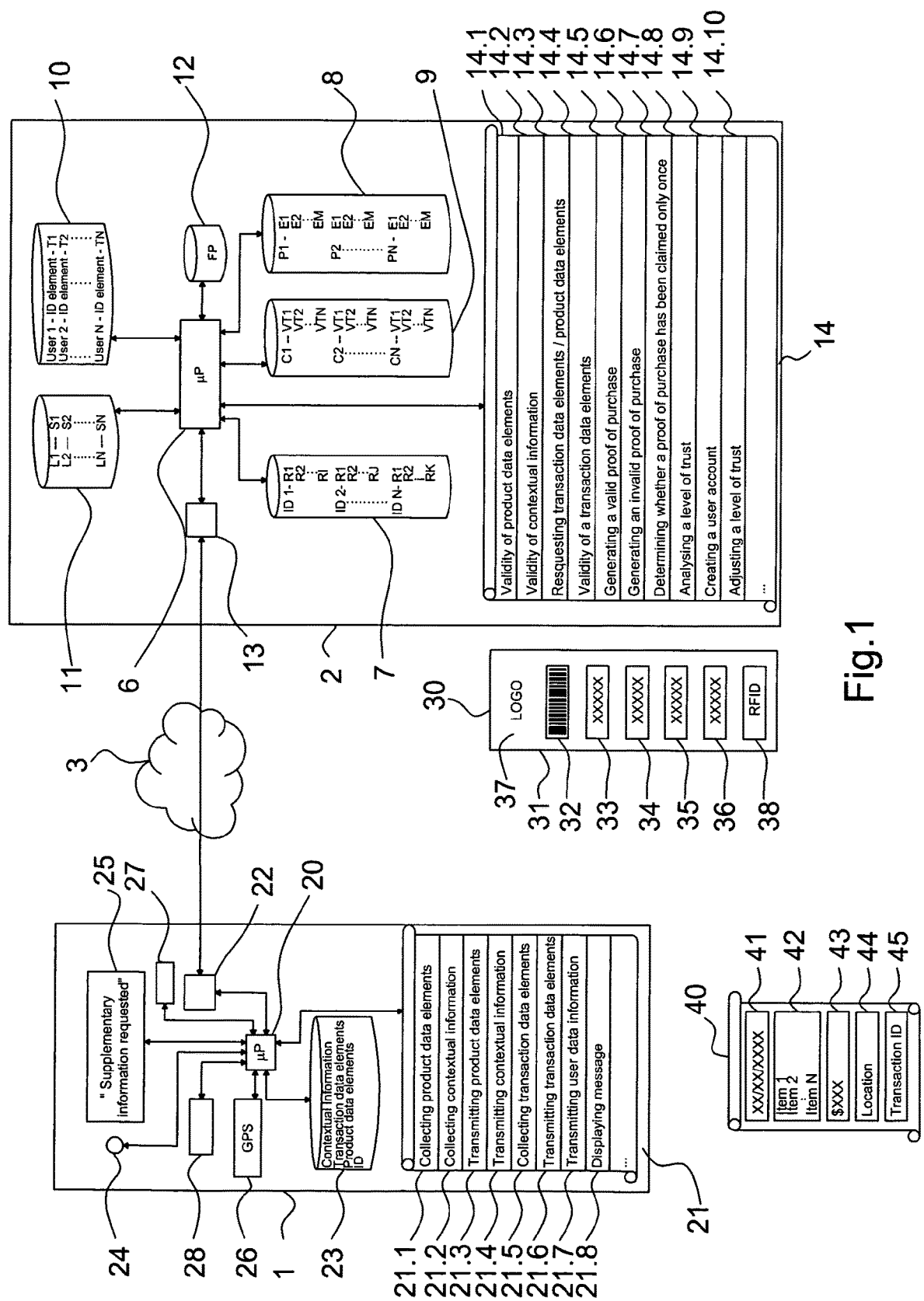
FIG. 1 is a schematic view of an exemplary mobile device and server system for carrying out methods according to embodiments of the invention.

FIG. 1 shows an exemplary system for carrying out methods according to embodiments of, the invention, in particular for generating a record R1-RI corresponding to the validity of a proof of purchase. Preferably the generated record R1-RI is an electronic file containing data related to the validity of the proof of purchase. This record R1-RI is stored in a validity database 7 of the server 2.

The system includes at least one mobile device 1 and at least one server 2. The mobile device 1 can be a mobile phone, a smart phone, a tablet, a PDA (Portable Digital Assistant), a laptop, and/or any other suitable mobile device. The mobile device 1 and the server 2 communicate with each other through a network 3. This network 3 may comprise a mobile network and/or the Internet and/or other networks.

The mobile device 1 includes a microprocessor 20 performing software instructions of programs 21.1-21.8 stored in the program memory 21. The mobile device 1 includes a communication device 22 allowing the device 1 to communicate with the server 2 through network 3 (e.g., GSM, 3G, WiFi, etc.). The mobile device 1 may also include a camera 24 (e.g., a digital camera), a near-field communication device 27 (e.g., RFID reader, Bluetooth, contactless reader, smartcards with or without antennas, etc.) and a keyboard 28, among other things. The keyboard 28 may be a physical or a virtual keyboard. The mobile device 1 includes a display 25 to interact with the user, and a localization device 26, for example a GPS.

The device 1 may also comprise one or more sensors, for example, a temperature sensor, a pressure sensor, a light sensor, a sound sensor, and/or an accelerometer/gyroscope, among others. Importantly, one or more of such sensors may be combined within a single structure (e.g., integrated circuit) or may be separate and distinct sensors. Furthermore the mobile device 1 has a data memory 23 for storing the identity of the user, contextual information, product data elements 31-37 and transaction data elements 41-45 obtained by the user, among other data.

The server 2 includes a microprocessor 6 coupled to databases 7-12 and a communication device 13 (e.g., WiFi interface, LAN interface, WAN interface, and/or other communication interface) allowing the server 2 to communicate with the mobile device 1 through network 3. The microprocessor 6 performs software instructions of programs 14.1-14.10 stored in the program memory 14.

The validity database 7 stores the records R1-RI corresponding to the validity of a proof of purchase and the identity ID1-IDN of the associated customer (or user). The product database 8 stores information P1-PM about products 30 and their associated list of valid product data elements E1-EM. The transaction database 9 stores information about criteria C1-CN of valid transaction data elements VT1-VTN, such as the date of the purchase, the name of the purchased product, the purchase amount (e.g., a monetary value of the purchase), the purchase location and the transaction ID. The user database 10 stores information about users, such as, for example, their identity and their associated level of trust T1-TN. The vendor database 11 stores information about vendors (e.g., stores, online storefronts, etc.) S1-SN selling a product carrying a discount offer and the vendor's associated location L1-LN. The pattern database 12 stores predetermined statistical fraud patterns.

Importantly, while the databases 7-12 are discussed herein as separate databases, such discussion is not intended to indicate that these elements must be separate and distinct. In other words, one or more of databases 7-12 may be comprised within a single relational database management system (RDBMS), for example within a single instance as tables within a single database, or one or more of databases 7-12 may be separate and distinct databases within separate instances, or any combination thereof.

Databases 7-12 may be implemented in any suitable database server, for example, Microsoft SQL Server, Oracle Server, MySQL, flat files, or other database systems. Note this list of database sever applications is not intended as limiting.

FIG. 1 also shows a product 30 having product data elements 31-38. These product data elements 31-38 can be for example, a packaging 31, a 1D or 2D barcode 32, a serial number 33, a batch number 34, a unique code 35 printed or stuck on the product 30, a best before date 36, a logo 37, and/or a RFID chip 38. The product data elements 31-38 may also be any specific product area instructed by a computer program, data from an RFID chip 38, and/or any data that can be gathered by the mobile device 1 near-field communication capabilities.

A receipt 40 in FIG. 1 comprises transaction data elements 41-45. These transaction data elements 41-45 can be, for example, the date of the purchase 41, the name of product purchased 42, the purchase amount 43, the purchase location 44 and/or a transaction ID 45, among other things.

When a customer is aware of an offer on a given product, for example, by seeing it advertised on his mobile device, in newspapers, in catalogs, on TV, in store or on the product itself, he may decide to buy the product at its retail price from a vendor carrying the product.

Figure 2:
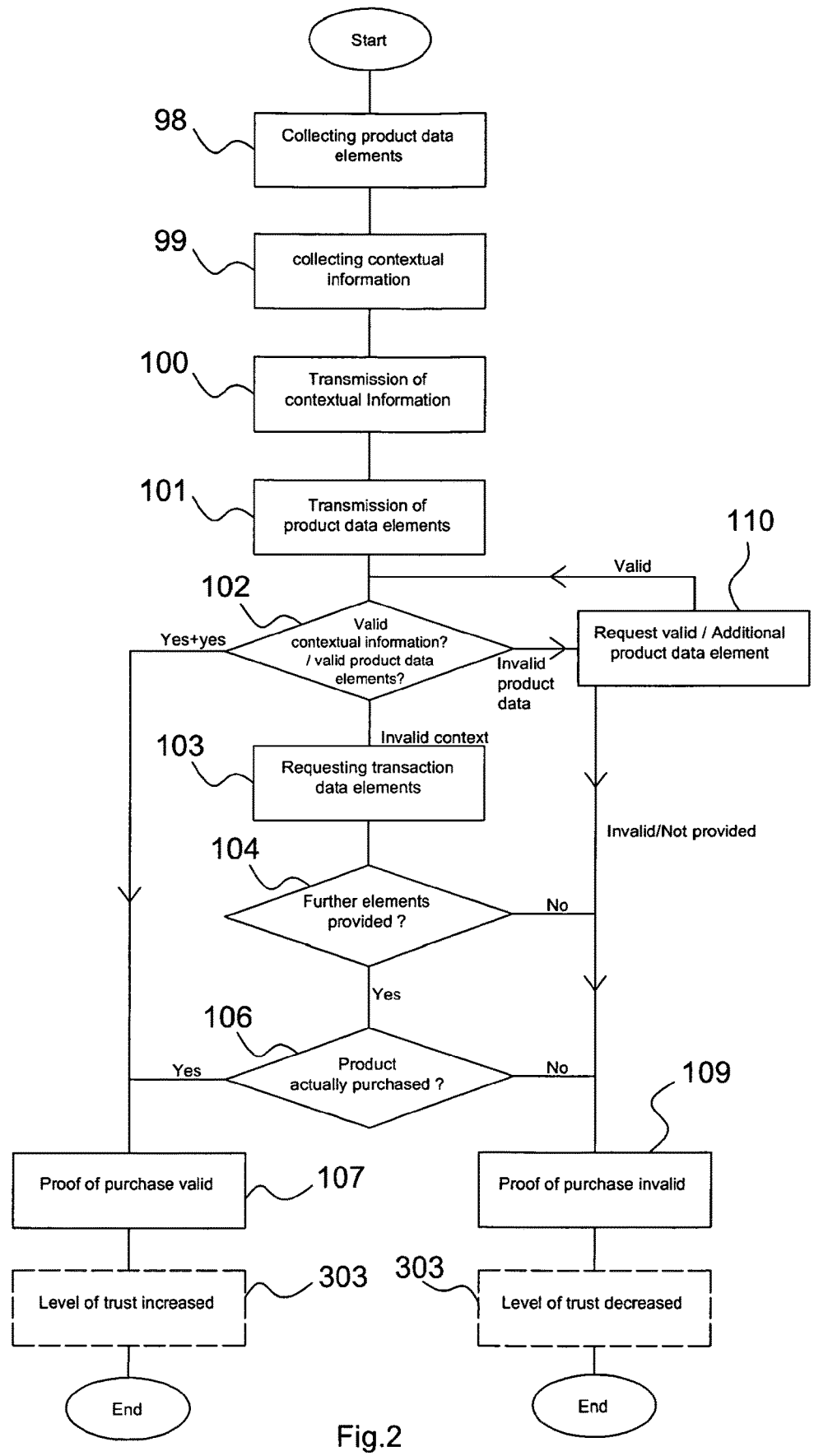
FIG. 2 shows an exemplary flowchart of a method according to embodiments of the invention for determining whether the proof of purchase is valid by considering contextual information.

As shown in FIG. 2, after the purchase, the consumer obtains in step 98 product data elements 31-37 by the camera 24, the keyboard 28 and/or the near-field communication device 27 through program 21.1 of the mobile device 1. The product data elements 31-37 obtained can be the barcode 32, a full view of the back or the front of the product packaging 31, the product logo 37, the product batch number 34, the best before date 36, the unique code 35 printed or stuck on the product 30, any specific product area instructed by a computer program, data from the RFID chip 38, and/or any data that can be gathered by the mobile device 1, for example using the device's near-field communication capabilities. The product data elements 31-37 requested for fulfillment may be indicated on the mobile device screen 25 and/or the product packaging 31 and/or the receipt 40.

To avoid fraud, a program 21.2 of the mobile 1 obtains in step 99 contextual information of the mobile device 1. Contextual information can be the geographic location of the device, the device's IP address, wireless networks available to the device, cellular network towers available to the device, ambient noise characteristics around the device, ambient light characteristics around the device, temperature near the device, pressure near the device, mobile device orientation and/or accelerometer data. Preferably contextual information comprises a geographic location of the device 1 returned by the localization device 26 (e.g., a GPS receiver of the device 1). Alternatively if no signal from the localization device 26 is available, the device can determine the network environment of the mobile by collecting the device's IP address and/or listing available wireless networks and/or cellular network towers. The correspondence between the network environment and the location can then be made by, for example, requesting the user to indicate whether he is in a specific place (for instance recording the network environment in the user's home or a network environment in a store (i.e. vendor's place of business)) based on this determination.

In steps 100 and 101, programs 21.3 and 21.4 of the mobile device 1 transmit obtained product data elements 31-37 and contextual information to the server 2. Product data elements 31-37 are analyzed and compared in step 102 through program 14.1 to the list of valid product data elements E1-EM stored in validity database 8 in order to determine whether product data elements 31-37 are valid. A program 14.2 determines in step 102 whether contextual information, particularly the location of the mobile device 1, matches a location L1-LN of a vendor S1-SN stored in the vendor database 11.

If the product data element 31-38 does not match the list of valid product data elements E1-EM, the user is instructed in step 110 to provide either correct or additional product data elements 31-37. If the correct product data elements or additional product data element are not provided, an invalid proof of purchase is generated in step 109.

If the obtained product data element(s) 31-37 is (are) contained within the list of valid product data elements E1-EM and if the location of the mobile device 1 does not match a location L1-LN stored in vendor database 11 (i.e., the mobile device 1 is not in the store), program 14.5 of server 2 generates a record R1-RI corresponding to a valid of the proof of purchase in step 107. Optionally, the level of trust T1-TN of the user defined hereafter may be increased accordingly in step 303 by program 14.10.

If the location of the mobile device 1 matches a location L1-LN stored in vendor database 11 (the mobile device 1 might still be in a store S1-SN), program 14.3 of server 2 sends in step 103 a message to the mobile device 1 requesting the user to obtain at least one further transaction data element 41-45 for determining whether the product 30 has effectively been purchased. The message is displayed to the user on screen 25 through program 21.8. It should be noted that it could be considered that the location of the device 1 matches the location L1-LN of the store S1-SN if the user is located within an area around the store determined based on the error factor provided by the localization device 26. For example, the error factor corresponds to an area of 50 meters around a returned location by the localization device 26.

The at least one further transaction data element 41-45 is provided by the receipt 40. This receipt 40 can be a transaction record such as a paper receipt, a credit card bill, an electronic fund transfer record, an electronic invoice, a confirmation email of a purchase, or a transaction ID, among others.

In step 104 the server 2 determines whether or not the customer has obtained through program 21.5 the at least one further transaction data element 41-45 and transmitted said at least one further transaction data element 41-45 through program 21.6 to the server 2.

If the at least one further transaction data element 41-45 is provided by the user, then program 14.4 determines in step 106 whether the at least one further transaction data element 41-45 matches the criteria C1-CN of a valid transaction VT1-VTN stored in transaction database 9. If the at least one further transaction data element 41-45 matches the criteria C1-CN, program 14.5 of server 2 generates in step 107 a record R1-RI corresponding to a valid proof of purchase.

Optionally the level of trust T1-TN of the user is increased accordingly in step 303 by program 14.10.

If no further transaction data element 41-45 is obtained by the user or if the transaction data element 40 does not match the criteria C1-CN of a valid transaction VT1-VTN, program 14.6 of server 2 generates in step 109 a record R1-RI corresponding to an invalid proof of purchase. Optionally the level of trust of the user T1-TN is decreased accordingly in step 303 by program 14.10.

The request made by the user for determining the validity of a proof of purchase contains the identity of the user and/or the location of the user and/or the obtained product data elements 31-37 of a target product 30.

Figure 3:
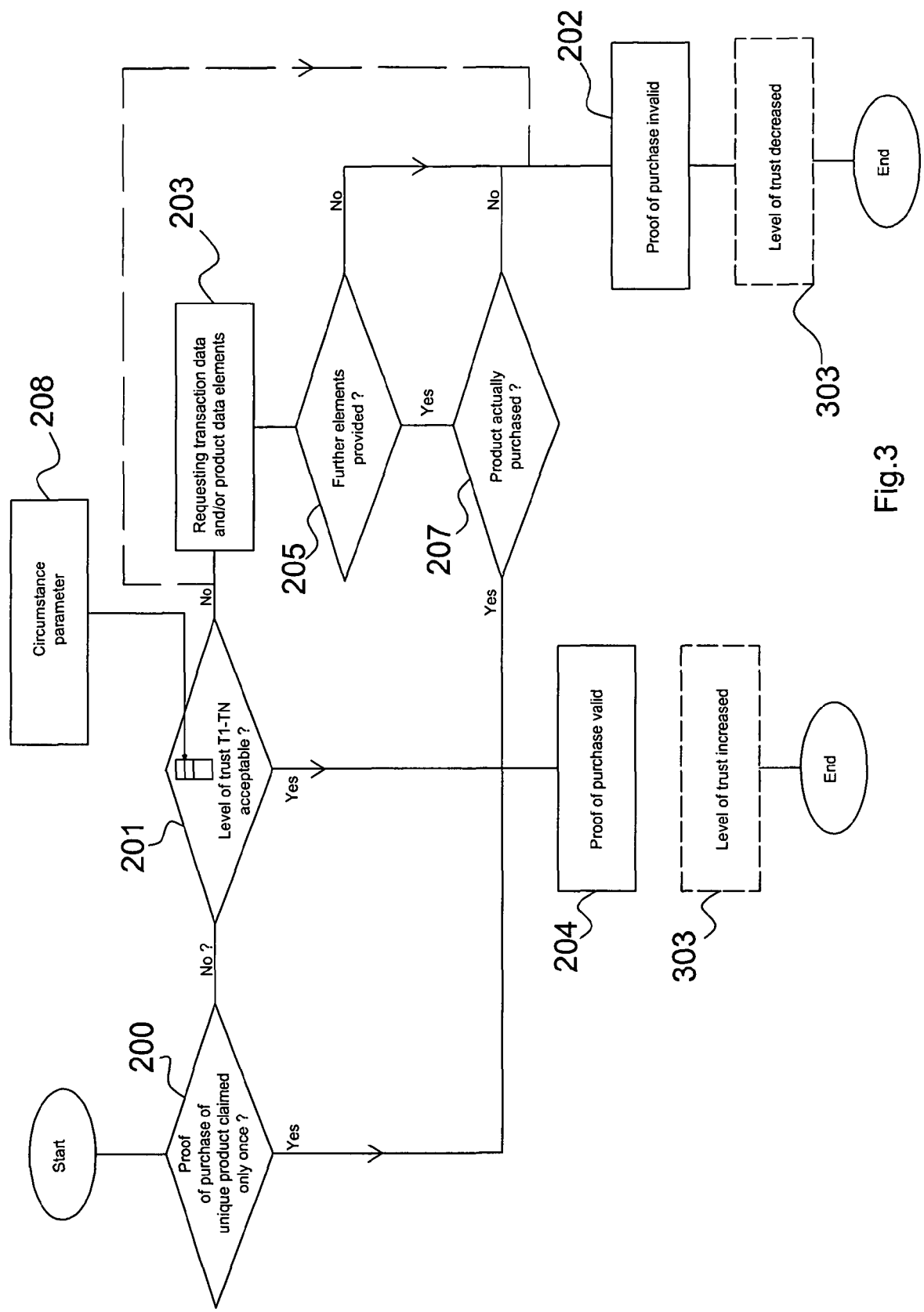
FIG. 3 shows an exemplary flowchart of a method according to embodiments of the invention for determining whether the proof of purchase is valid by verifying if the proof of purchase has been claimed only once.

With reference to FIG. 3, a program 14.7 of server 2 determines in a step 200 whether the proof of purchase of a given product 30 has been claimed only once. To accomplish this, the server 2 determines by statistical means whether or not the requests of the user (i.e. the location of the user, and/or the target products and/or the identity of users) match statistical fraud patterns FP stored in pattern database 12.

If the proof of purchase has been claimed only once (for example the request does not match the fraud pattern FP), program 14.5 of server 2 generates in step 204 a record R1-RI corresponding to a valid proof of purchase. Optionally the level of trust T1-TN of the user is increased accordingly in step 303.

If the proof of purchase of the given product 30 may have been claimed more than once (for example the request matches fraud patterns FP), the level of trust T1-TN of the customer is analyzed in step 201 through program 14.8 of the server 2. The level of trust T1-TN of a user is based upon the number of personal pieces of information provided by the user concerning his identity and/or the history of success of the user in providing further product data elements 31-37 and/or transaction data elements 41-45 when requested (see FIG. 4 for more details).

If the level of trust T1-TN is superior to a given threshold value, a record R1-RI corresponding to a valid proof of purchase is generated in step 204.

The threshold value may depend on a circumstance parameter, stored in product database 8. This circumstance parameter is set depending on, for example, the type of product, its price, the requested level of proof, or at the request of the company offering the discount. For example, if the product is a high priced electronics device, the circumstance parameter may reflect this fact, and the system less likely to grant a valid proof of purchase absent more elements.

If the level of trust T1-TN is inferior to a given threshold value, program 14.6 of server 2 generates a record R1-RI corresponding to an invalid proof of purchase.

Alternatively, in step 203 server 2 sends through programs 14.3, 14.11 a message to the mobile device 1 requesting the user to obtain at least one further transaction data element 41-45 and/or at least one further product data element 31-37 for determining whether the product 30 has effectively been purchased. The message is displayed to the user on screen 25 through program 21.8.

In step 205 the server 2 determines whether or not the user has obtained (through programs 21.1, 21.5) the at least one further transaction data element 41-45 and/or product data element 31-37 and transmitted (through programs 21.3, 21.6) the transaction data element 41-45 and/or product data element 31-37 to the server 2.

If the transaction data element 41-45 and/or product data element 31-37 is provided by the user, then in step 207 a program 14.4 and/or 14.1 of server 2 determines whether the transaction data element 41-45 matches the criteria C1-CN of a valid transaction VT1-VTN and/or whether the product data element 31-37 is contained within the list of valid product data element E1-EM stored in product database 8. If the transaction data element 41-45 matches the criteria C1-CN of a valid transaction VT1-VTN and/or the product data element 31-37 is contained within the list of valid product data elements E1-EM, program 14.5 of server 2 generates a record R1-RI corresponding to a valid proof of purchase. Optionally the level of trust T1-TN of the user is increased accordingly in step 303.

If no transaction data element 41-45 and/or product data element 31-37 is obtained or if the at least one transaction data element 41-45 and/or product data element 31-37 does not match respectively the criteria C1-CN of a valid transaction VT1-VTN or the list of valid product element E1-EM, program 14.6 of server 2 generates in step 202 a record R1-RI corresponding to an invalid proof of purchase. Optionally the level of trust T1-TN of the user is decreased accordingly in step 303.

Figure 4:
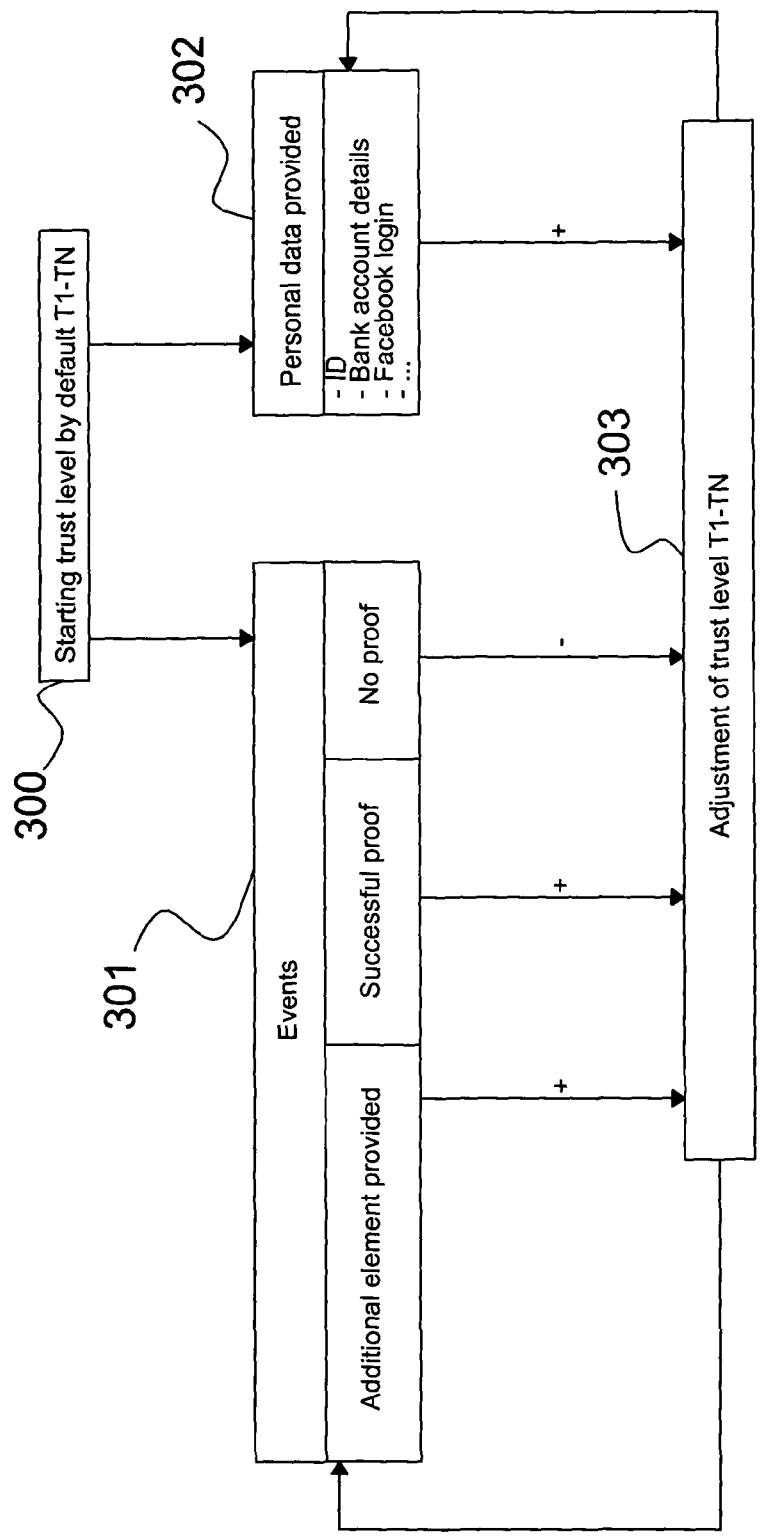
FIG. 4 shows an exemplary flowchart of a method according to the invention for adjusting the level of trust of a user using a scoring algorithm.

With reference to FIG. 4, the level of trust T1-TN of a user is based upon the number of personal pieces of information provided by the user validating his identity and/or the history of success of the user in providing further product data elements and/or transaction data elements when requested.

A default starting value is associated with the level of trust T1-TN at the creation of the user's account in step 300 through program 14.9 of server 2. Then, if the user provides personal data, such as, for example, a copy of a valid ID, valid bank account details, a Facebook login, and/or other valid personal information (e.g., a credit card number) in a step 302 through program 21.7, program 14.10, the level of trust T1-TN is increased in step 303 by program 14.10. This means that the more personal information the user provides the server 2, the greater his level of trust T1-TN is increased.

Moreover, if correct further product data element 31-37 and/or transaction data element 41-45 is/are provided when requested in steps 104 and/or 205, the level of trust T1-TN is increased in step 303 by program 14.10. On the contrary if further product data element 31-37 and/or transaction data element 41-45 is/are not provided when requested in steps 104 and/or 205 or do not correspond respectively to the list of valid product data element E1-EM or to criteria C1-CN of valid transaction VT1-VTN, the level of trust T1-TN is decreased in step 303 by program 14.10.

Furthermore if a record R1-RI corresponding to a valid proof of purchase is generated in steps 107 and/or 204, the trust level T1-TN is increased in step 303 by program 14.10. On the contrary if a record R1-RI corresponding to an invalid proof of purchase is generated in step 109, 202, the level of trust T1-TN is decreased in step 303 by program 14.10.

Throughout the description, including the claims, the term "comprising a" shall be understood as being synonymous with "comprising at least one" unless otherwise stated. In addition, any range set forth in the description, including the claims shall be understood as including its end value(s) unless otherwise stated. Specific values for described elements shall be understood to be within generally accepted industry tolerances, and any use of the terms substantially and/or approximately shall be understood to mean falling within such generally accepted tolerances. The term "near" shall be understood to mean within a generally acceptable range to allow sensors of normal sensitivity to sense a specified characteristic. Moreover, the terms "user" and "customer" have been used interchangeably herein and should be understood to mean generally an operator of a mobile device.

Although the present invention herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the scope of the invention as defined by the appended claims.

The invention claimed is:

1. A method for providing an improvement in verifying validity of a proof of purchase using computer program applications for generating a record corresponding to the validity of the proof of purchase implemented in computer systems, the method comprising:
   receiving, at a computer server, a product data element of a product from a mobile device via one or more computer networks;
   requesting, from a global positioning system (GPS) receiver implemented in the mobile device, contextual information of the mobile device;
   in response to the requesting, receiving, from the GPS receiver implemented in the mobile device, the contextual information, the contextual information comprising encoded GPS location data and an error factor, of the mobile device;
   retrieving, from a database, a purchaser level of trust of a purchaser of the product;
   determining, at the computer server, from the contextual information and the product data element, whether a proof of purchase of the product is valid, by:
      accessing a database establishing a correspondence between stores, locations of said stores, and a list of valid product data elements,
      determining whether the product data element is contained within the list of valid product data elements, and
      determining whether a location of the mobile device matches a location stored in the database in order to determine whether or not the mobile device is in a store;
   in response to determining that the product data element is contained within the list of valid product data elements and that the location data of the mobile device does not match the location stored in the database, generating a record corresponding to a valid proof of purchase;
   in response to determining that the location data of the mobile device matches the location stored in the database, performing the steps of:
      sending a message to the purchaser requesting to obtain a transaction data element for determining whether the product has effectively been purchased,
      receiving, in response to the message, the transaction data element,
      accessing a database containing criteria for a valid transaction,
      determining whether the transaction data element matches the criteria for a valid transaction, and
      generating a record corresponding to a valid proof of purchase when the transaction data element matches the criteria of a valid transaction;
   in response to determining that the proof of purchase is valid, increasing the purchaser level of trust of the purchaser by a first value;

determining whether the proof of purchase of the product has been claimed only once;
in response to determining that the proof of purchase was claimed only once:
generating a record corresponding to a valid proof of purchase when the proof of purchase has been claimed only once;
in response to determining that the proof of purchase of the product has been claimed more than once:
determining that personal information was provided and stored in the database, wherein the personal information comprises an identifier associated with the purchaser and one or more of a copy of a valid identification of the purchaser or valid bank account details of the purchaser,
sending a message to the purchaser requesting to obtain at least one further product data element and/or a transaction data element,
receiving, in response to the message, the further product data element and/or the transaction data element,
accessing a database containing criteria for a valid transaction and a list of valid product data elements,
determining whether the further product data element matches the list of valid product data elements or whether the transaction data element matches criteria of a valid transaction, and
generating a record corresponding to a valid proof of purchase when the further product data element matches the list of valid product data elements or if the transaction data element matches the criteria of a valid transaction;
in response to determining that the proof of purchase was claimed more than once and in response to determining that the personal information of the purchaser has been provided:
increasing the purchaser level of trust by a second value which is proportional to a count of personal information items provided by the purchaser,
determining a default level of trust based on a type of the product and a price of the product, wherein the default level of trust is proportional to the type of the product and the price of the product and wherein a high price product is less likely to be granted a valid proof of purchase, and
determining whether the purchaser level of trust exceeds the default level of trust; and
in response to determining that the purchaser level of trust exceeds the default level of trust:
lowering the purchaser level of trust by a default amount;
generating and storing on a computer readable medium a record indicating that the proof of purchase is valid but was presented more than once;
based on the record, generating an electronic proof of purchase and transmitting the electronic proof of purchase to the mobile device.

2. The method according to claim 1, wherein the product data element is obtained by a camera, a keyboard, or a near-field communication device of the mobile device.

3. The method of claim 1, wherein the product data element is one or more of: a barcode of the product, a full or partial view of the product, a product logo, a produce serial number, a product batch number, a best before date of the product, a unique code printed or stuck on the product, a specific product area as instructed by a computer program, or data that can be gathered by near-field communication capabilities of the mobile device.

4. The method of claim 1, the contextual information is a geographic location of the mobile device, an IP address, wireless networks available to the mobile device, cellphone towers available to the mobile device, ambient noise characteristics, ambient light characteristics, temperature, pressure, mobile device orientation or accelerometer data.

5. The method of claim 1, further comprising:
generating a record corresponding to an invalid proof of purchase when no transaction data element is obtained or if the transaction data element does not match the criteria of a valid transaction.

6. The method according to claim 1, further comprising:
storing in the computer server a database containing predetermined statistical fraud patterns;
determining by statistical means whether or not a request from the purchaser matches fraud patterns; and
requesting one or more further product elements or transaction data elements for requests matching statistical fraud patterns.

7. The method of claim 1, wherein the computer server comprises a database storing identities of users and a level of trust associated to each user, wherein requesting further product data elements or transaction data elements depends on the product data element or contextual information already provided and on said level of trust of the user.

8. The method of claim 7, further comprising:
in response to determining that the proof of purchase of purchasing a given product was claimed more than once, generating a second record indicating that the proof of purchase of the given product was claimed more than once and the level of trust is superior to a given value.

9. The method of claim 8, further comprising:
generating a record corresponding to an invalid proof of purchase when the proof of purchase of the given product was claimed more than once and the level of trust is inferior to the given value.

10. The method of claim 9, a circumstance parameter being stored in a database, and the given threshold value of the level of trust needed to validate a given proof of purchase depending on the circumstance parameter.

11. The method of claim 8, wherein the level of trust of a user is based upon one or more of: knowledge of the user, personal pieces of information provided by the user validating his identity, history of success of the user in providing further product data elements, or transaction data elements.

12. The method of claim 8, wherein a transaction data element, from among the transaction data elements, contains at least a date of purchase, a name of the product purchased, a purchase amount, a purchase location and a transaction identifier.

13. The method of claim 12, a transaction data element, from the transaction data elements, comprising one or more of a paper receipt, a credit card bill, an electronic fund transfer record, an electronic invoice, or a confirmation email of a purchase.

14. One or more non-transitory computer-readable media storing instructions which, when processed by one or more processors, cause the one or more processors to execute verifying validity of a proof of purchase for generating a record corresponding to the validity of the proof of purchase by:
receiving a product data element of a product from a mobile device via one or more computer networks;
requesting contextual information of the mobile device;

in response to the requesting, receiving the contextual information, the contextual information comprising location data and an error factor of the mobile device;
retrieving, from a database, a purchaser level of trust of a purchaser of the product;
determining, from the contextual information and the product data element, whether a proof of purchase of the product is valid, wherein the determining of whether the proof of purchase is valid comprises:
 accessing a database establishing a correspondence between stores, locations of said stores, and a list of valid product data elements,
 determining whether the product data element is contained within the list of valid product data elements, and
 determining whether a location of the mobile device matches a location stored in the database in order to determine whether or not the mobile device is in a store;
in response to determining that the product data element is contained within the list of valid product data elements and that the location data of the mobile device does not match the location stored in the database, generating a record corresponding to a valid proof of purchase;
in response to determining that the location data of the mobile device matches the location stored in the database, performing the steps of:
 sending a message to the purchaser requesting to obtain a transaction data element for determining whether the product has effectively been purchased,
 receiving, in response to the message, the transaction data element,
 accessing a database containing criteria for a valid transaction,
 determining whether the transaction data element matches the criteria for a valid transaction, and
 generating a record corresponding to a valid proof of purchase when the transaction data element matches the criteria of a valid transaction;
in response to determining that the proof of purchase is valid, increasing the purchaser level of trust of the purchaser by a first value;
determining whether the proof of purchase of the product has been claimed only once;
in response to determining that the proof of purchase was claimed only once:
 generating a record corresponding to a valid proof of purchase when the proof of purchase has been claimed only once;
in response to determining that the proof of purchase of the product has been claimed more than once:
 determining that personal information was provided and stored in the database, wherein the personal information comprises an identifier associated with the purchaser and one or more of a copy of a valid identification of the purchaser or valid bank account details of the purchaser,
 sending a message to the purchaser requesting to obtain at least one further product data element and/or a transaction data element,
 receiving, in response to the message, the further product data element and/or the transaction data element,
 accessing a database containing criteria for a valid transaction and a list of valid product data elements,
 determining whether the further product data element matches the list of valid product data elements or whether the transaction data element matches criteria of a valid transaction, and
 generating a record corresponding to a valid proof of purchase when the further product data element matches the list of valid product data elements or if the transaction data element matches the criteria of a valid transaction;
in response to determining that the proof of purchase was claimed more than once and in response to determining that the personal information of the purchaser has been provided:
 increasing the purchaser level of trust by a second value which is proportional to a count of personal information items provided by the purchaser,
 determining a default level of trust based on a type of the product and a price of the product, wherein the default level of trust is proportional to the type of the product and the price of the product and wherein a high price product is less likely to be granted a valid proof of purchase, and
 determining whether the purchaser level of trust exceeds the default level of trust; and
in response to determining that the purchaser level of trust exceeds the default level of trust:
 lowering the purchaser level of trust by a default amount,
 generating and storing a record indicating that the proof of purchase is valid but was presented more than once, and
 based on the record, generating an electronic proof of purchase and transmitting the electronic proof of purchase to the mobile device.

15. The one or more non-transitory computer-readable media of claim 14, further comprising instructions which, when processed by the one or more processors, cause the one or more processors to further execute:
 generating a record corresponding to an invalid proof of purchase when no transaction data element is obtained or if the transaction data element does not match the criteria of a valid transaction.

16. The one or more non-transitory computer-readable media of claim 14, further comprising instructions which, when processed by the one or more processors, cause the one or more processors to further execute:
 storing in the computer server a database containing predetermined statistical fraud patterns;
 determining by statistical means whether or not a request from the purchaser matches fraud patterns; and
 requesting one or more further product elements or transaction data elements for requests matching statistical fraud patterns.

17. The one or more non-transitory computer-readable media of claim 14, further comprising instructions which, when processed by the one or more processors, cause the one or more processors to further execute:
 in response to determining that the proof of purchase of the product was claimed more than once, generating a second record indicating that the proof of purchase of the product was claimed more than once and that the purchaser level of trust is superior to a given threshold value.

18. The one or more non-transitory computer-readable media of claim 17, further comprising instructions which, when processed by the one or more processors, cause the one or more processors to further execute:

generating a record corresponding to an invalid proof of purchase when the proof of purchase of the product was claimed more than once and the purchaser level of trust is inferior to the given threshold value.

* * * * *